(12) United States Patent
Ghose et al.

(10) Patent No.: US 7,899,925 B2
(45) Date of Patent: *Mar. 1, 2011

(54) SYSTEM AND METHOD FOR FAST, RELIABLE BYTE STREAM TRANSPORT

(76) Inventors: Kanad Ghose, Vestal, NY (US); Peter Sulatycke, Vestal, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/950,322

(22) Filed: Dec. 4, 2007

(65) Prior Publication Data

US 2010/0046370 A1 Feb. 25, 2010

Related U.S. Application Data

(63) Continuation of application No. 09/894,585, filed on Jun. 28, 2001, now Pat. No. 7,305,486.

(60) Provisional application No. 60/215,337, filed on Jun. 30, 2000.

(51) Int. Cl.
*G06F 15/16* (2006.01)

(52) U.S. Cl. ......... 709/232; 709/230; 709/231; 709/223; 370/229

(58) Field of Classification Search .......... 709/230–236, 709/223; 370/229
See application file for complete search history.

(56) References Cited

U.S. PATENT DOCUMENTS

| | | | |
|---|---|---|---|
| 4,475,192 A | 10/1984 | Fernow et al. | |
| 4,841,526 A | 6/1989 | Wilson et al. | |
| 5,063,562 A * | 11/1991 | Barzilai et al. | 370/231 |
| 5,245,616 A | 9/1993 | Olson | |
| 5,432,824 A | 7/1995 | Zheng et al. | |
| 5,442,637 A | 8/1995 | Nguyen | |
| 5,528,591 A | 6/1996 | Lauer | |
| 5,553,083 A | 9/1996 | Miller et al. | |
| 5,633,867 A | 5/1997 | Ben-Nun et al. | |
| 5,727,002 A | 3/1998 | Miller et al. | |
| 5,825,602 A | 10/1998 | Barkey et al. | |
| 5,825,748 A * | 10/1998 | Barkey et al. | 370/236 |
| 5,852,602 A | 12/1998 | Sugawara | |
| 5,920,705 A | 7/1999 | Lyon et al. | |
| 5,931,916 A | 8/1999 | Barker et al. | |
| 6,006,254 A | 12/1999 | Waters et al. | |
| 6,038,606 A | 3/2000 | Brooks et al. | |
| 6,044,406 A * | 3/2000 | Barkey et al. | 709/235 |
| 6,205,120 B1 | 3/2001 | Packer et al. | |
| 6,219,713 B1 | 4/2001 | Ruutu et al. | |
| 6,243,358 B1 | 6/2001 | Monin | |

(Continued)

OTHER PUBLICATIONS

Kung, H.T. and Morris, Robert, "Credit-Based Flow Control for ATM Networks," IEEE Network Magazine, 11 pages, Mar. 1995.

(Continued)

*Primary Examiner* — Ramy M Osman
(74) *Attorney, Agent, or Firm* — McDonnell Boehnen Hulbert & Berghoff LLP

(57) ABSTRACT

Reliable byte stream transfer protocols play an important role in modern networks. The present invention implements such a protocol using credits for flow control and negative acknowledgements for reliable delivery. The credit mechanism uses credit transfer in installments and is immune to the losses or corruptions of intermediate credit installments. Negative acknowledgements are used to solicit the retransmission of data stream component. The present invention provides full compatibility at the programming interface with reliable byte transfer protocols, such as TCP, and also allows full interoperability among hosts running the aforesaid standard protocol or the protocol of the present invention.

25 Claims, 7 Drawing Sheets

U.S. PATENT DOCUMENTS

| | | |
|---|---|---|
| 6,337,865 B1 | 1/2002 | Seto et al. |
| 6,347,337 B1 | 2/2002 | Shah et al. |
| 6,594,701 B1 * | 7/2003 | Forin .................. 709/231 |
| 6,654,787 B1 | 11/2003 | Aronson et al. |
| 6,683,850 B1 | 1/2004 | Dunning et al. |
| 6,724,721 B1 | 4/2004 | Cheriton |
| 6,920,152 B1 * | 7/2005 | Chang et al. .................. 370/474 |
| 7,305,486 B2 * | 12/2007 | Ghose et al. .................. 709/232 |
| 2008/0313240 A1 * | 12/2008 | Freking et al. ................ 707/201 |

OTHER PUBLICATIONS

Fox, R., "TCP Window and Nak Options," Network Working Group, Jun. 1989.

Mathis et al, "TCP Selective Acknowledgement Options," Network Working Group, 12 pages Oct. 1996.

Internet Engineering Task Force, "Requirements for Internet Hosts—Communication Layers," R. Braden, Editor, Oct. 1989.

International Search Report for PCT Pat. App. No. PCT/US01/20699, mailed Oct. 9, 2001.

* cited by examiner

SYSTEM AND METHOD FOR FAST, RELIABLE BYTE STREAM TRANSPORT

RELATED APPLICATIONS

The present application is a Continuation of U.S. patent application Ser. No. 09/894,585, Filed: Jun. 28, 2001, now U.S. Pat. No. 7,305,486 (Dec. 4, 2007), which is a non-provisional claiming benefit of priority from U.S. Provisional Patent Application No. 60/215,337, filed Jun. 30, 2000, each of which is expressly incorporated herein by reference for all purposes.

BACKGROUND OF THE INVENTION

This invention relates to digital packet transmission, and particularly to a method for fast, reliable byte stream transport in communication environments.

A computer network ties a number of computers, terminals and wireless devices together for the exchange of information. These computers, terminals and wireless devices are also called nodes of the network. The main protocol suite in use in computer networks, including the Internet, is TCP/IP. TCP stands for Transmission Control Protocol and IP stands for Internet Protocol. The IP protocol suite provides point-to-point datagram delivery and is potentially unreliable. These protocols are defined by the Internet Engineering Task Force, specifications available at www.ietf.org. The TCP protocol runs on top of IP and implements reliable end-to-end delivery of byte streams between nodes. In addition, TCP has facilities in place to ensure the in-order, reliable delivery of information.

TCP's View of the Network

TCP is designed to cope with networks that are potentially unreliable. In fact, TCP makes the following assumptions about the network: The network can drop packets due to intermittent faults or because of congestion, which lead to buffer overruns or long routing delays. The packets that make up the byte stream may get delivered out of the order in which they were transmitted at the source. Part or all of the packet data can get corrupted; if this happens to a packet, the packet is dropped. The amount of buffer space available at routers on the way to the destination or at the destination itself is unknown—the sender has to discover this dynamically and adjust the sending rate appropriately to avoid packet losses.

These assumed characteristics of the network have driven the features that are in today's TCP standard.

TCP's Artifacts for Coping with the Assumed Network Characteristics

To cope with these assumed characteristics of the network, TCP employs the following mechanisms to guarantee end-to-end reliable byte stream transport: (a) A retransmission mechanism based on the use of acknowledgments from the receiver and a timeout facility for a transmitted packet at the sender. The duration of this timeout period is dynamically updated to reflect the recently perceived delay in the network. (b) A window-based flow control mechanism to limit the number of packets a sender can transmit without receiving acknowledgments. The net effect is to really limit the number of packets in transit. (c) A congestion control mechanism that is integrated into the window mechanism to throttle the sender when packet losses are persistently perceived by the sender. The congestion control mechanism of TCP also allows the sender's transmission rate to ramp up subsequently when the level of congestion is eased. (d) TCP uses check-summing to guarantee data integrity. Actually two check-sums, a TCP checksum and an IP checksum, are performed on all packets. The TCP checksum is computed over the TCP pseudoheader (made up of the IP addresses of the endpoints and the socket addresses), the IP header and the packet data. The independent IP checksum is also used to guarantee the integrity of the IP header. (e) A packet reassembly facility to collate received packets in proper order of the byte sequence.

Performance Implications

These mechanisms do not come for free: a substantial protocol overhead results when the above mechanism are used, manifesting in the form of high end-to-end delays.

Specifically, the overhead results from the following: 1. The cost of implementing the retransmission timer (as well as other timers not connected in any explicit way with timeout mechanism). This cost has several components: (i) The book-keeping overhead for the timers, linking each individual transmitted packet into the queue of packets that have not been acknowledged (i.e., packets that may need to be retransmitted) and unlinking when the packets are acknowledged. (ii) The overhead for dynamically computing accurate estimates of the round trip time (RTT), whose value decides the duration of the retransmission timer. (iii) The overhead of hardware timer interrupts: All of the timers used by TCP are implemented in software using hardware timers for the ticks. To implement the software timers, each of the locations implementing such timers have to be decremented when the hardware "tick" timer generates an interrupt. The interrupt handling time is usually quite high. Notice that these timer manipulations triggered by hardware "tick" timer interrupts are done even when transmitted packets are acknowledged. 2. The bookkeeping overhead for the windowing mechanism. During routine transfers without errors or packet dropping, additional code is executed to monitor and update the current state of the connection. 3. The checksum computations (for the TCP and IP checksum) typically involves repeated movement of part or all of the packet data through the processor cache and the memory, resulting in serious performance degradation due to cache pollutions. This is particularly detrimental in modern CPUs where CPU clock rates continue to increase dramatically as memory systems speeds remain practically flat. In some implementations, the situation is aggravated when the checksums are computed incrementally in a distributed fashion. 4. On a packet loss, TCP initiates the retransmission of packets starting with the one that was not acknowledged. This results in the unnecessary retransmissions of packets that may have already been received and properly acknowledged.

This protocol overhead severely limits the latency and bandwidth of networks. When TCP was originally developed the software overhead was very small compared to the overall time because networks speeds were slow. Today this has changed; the speed of modern networks has dramatically increased relative to the processing power of networking nodes. Thus TCP software overhead is now a significant portion of the overall end-to-end communication delay. This relative increase in software overhead severely restricts the performance of modern networks and prevents the full potential of networking hardware from being realized. Even with its poor latency characteristics, TCP remains the networking protocol of choice due to its support for client-server applications, large installed base and its compatibility with legacy code. In fact, compatibility is often even more important than performance. For example, modern low-latency technologies such as ATM, implement TCP on top of their native protocols just to gain compatibility with existing networking software. To exploit the capabilities of modern high-end networking hardware, it is essential to reduce the overhead in the TCP protocol.

Over the years, some of the inefficiencies of TCP have been recognized and a variety of improvements to the protocol have been suggested. Some of the techniques proposed for speeding up TCP have showed up as Requests for Comments (RFCs) with the Internet Engineering Task Force (IETF accessible at URL: http:www.ietf.org) and are fairly well-known. What follows is a summary of the more common approaches taken to improve TCP performance.

1) SACKs: One well known technique is selective acknowledgements (SACKs) described in RFC 2018, "TCP Selective Acknowledgement Options", by Mathis et al. Here a single SACK actually acknowledges the status of receiving a group of consecutive packets. By using a bit vector within the SACK, the sender is told explicitly the packets in the group that have been received properly and the ones that have been lost. The sender then (selectively) retransmits only the lost packets. Thus this technique improves the retransmission response time for lost packets. However this technique has two main inefficiencies: first, the bit vector has to be scanned to determine the identity of the lost packets; second, ACKs are explicitly sent and processed, with an associated timer management and bookkeeping overhead.

2) Negative Acknowledgements (NAKs or NACKs) and Larger Windows: In RFC 1106, "TCP Big Window and NAK Options", by R. Fox, the use of NAKs and larger windows have been proposed to enhance the efficiency of connections that have a long bandwidth-delay product (such as satellite links). NAKs improve the retransmission response time for lost packets, but do not reduce overhead because ACKs are still used. Additionally, the NAKs used here are "advisory", meaning that implementations can ignore it with no impact.

3) Delayed ACKs: In RFC 1122, "Requirements for Internet Hosts—Communication Layers", edited by R. Braden, delays ACKs reduce processing demands by reducing the total number of ACKs sent. However, this has limited effect because timer management and bookkeeping overhead remains the same.

4) Reduced Number of ACKS: U.S. Pat. No. 6,038,606, "Method and Apparatus for Scheduling Packet Acknowledgements", by Brooks et al., reduces the number of ACKs needed in TCP. During the initial slow start phase of TCP ACKs are sent for every two packets. Once the connection is running at full speed, ACKs are only sent for every W-2 consecutive packets; where W is the number of packets that fit in one window. The sender's timeouts must be set large enough so that they do not timeout for a full windows worth of packets. If congestion occurs the normal TCP ACK technique is used. This technique has limited impact on performance since timers for all packets are still maintained.

5) Delayed Processing: U.S. Pat. No. 5,442,637, "Reducing the Complexities of the Transmission Control Protocol for a High-Speed Networking Environment", by M. Nguyen, cuts back on processing at the receiver by delaying processing of every N received packets. The receiver then processes all control information in these packets at once. This cuts down on the number of timers needed for each packet and improves performance. On the downside this causes the system to start up slower than usual. To counter this, a rate-based flow control is added to the system.

6) Smart ACKs: U.S. Pat. No. 5,245,616, "Technique for Acknowledging Packets", by G. Olson, describes an ACK that contains a bit vector indicating the status of the current packet and the seven previous packets. If an ACK is lost due to an error on the line it is very likely that a subsequent ACK will contain information on this packet. Thus this redundant information prevents the sender from retransmitting when it is not needed. In addition, this vector is used to indicate that a packet was dropped and must be retransmitted. This reduces the amount of time needed to trigger a retransmission but it does not reduce timer overhead.

7) Sliding Window Adjustment Techniques: U.S. Pat. No. 6,219,713, "Method and Apparatus for Adjustment of TCP Sliding Window with Information about Network Conditions", by J. Ruutu et al., describes a technique to modify TCP's sliding window based on load condition and traffic congestion for the network. Additionally, U.S. Pat. No. 6,205,120, "Method and Apparatus for Transparently Determining and Setting an Optimal Minimum Required TCP Window Size", by Packer et al., transparently modifies a receiver window size based on network latency. These methods provide some performance improvement under certain conditions but they are still bound by the inefficiencies of TCP's windowing mechanism.

All of these mechanisms are piece-meal fixes to solve the inefficiencies associated with the windowing mechanism of TCP and thus have had limited success. None of these techniques reduce the overhead from TCP's windowing mechanism or retransmission timers. This overhead severely limits the latency and bandwidth of modern LANs. Thus there is a significant opportunity to design a reliable byte stream transport system that has significantly less overhead than TCP. In so doing, the full potential of modern low-latency network technologies can be attained.

One of main reasons for TCP's significant overhead is that its design is based on older unreliable network technology. Today's networking technologies are more reliable than the assumptions made by TCP. This is particularly the case in local area networks (LANs). In modern networking technologies, the following scenario exists: Packets are rarely dropped Packets are not delivered out-of-sequence Packets are rarely corrupted Many of these scenarios are also valid for quality conscious switched networks larger than LANs. Thus it would be advantageous to take a more optimistic approach, consistent with the above observations for a modern networks, and provide a reliable byte stream transport system with less software overhead. This in turn would greatly improve end-to-end latency and effective bandwidth within modern networks.

It would also be advantageous to make this new transport system fully compliant with the current application programming interface (API) of TCP. This would allow all current client-server networking applications to run without any change or recompilation.

It would also be advantageous to provide a mechanism that can distinguish between packets meant for standard TCP and the new byte stream transport system and forward the data to the corresponding transport system. This would allow full interoperability with hosts running traditional TCP implementations or the new byte stream transport system.

SUMMARY OF THE INVENTION

Most efforts to improve TCP have been piecemeal. The real problem is in TCP's flow control windowing scheme, retransmit timeout mechanism and associated overhead. In accordance with the present invention, the TCP windowing scheme is abandoned in favor of a more efficient credit and NACK-based flow control mechanism.

Fundamental to this invention is the notion of using credits for flow control (i.e., the process of regulating data flow between the sender and receiver). Credits, also called buffer-to-buffer credits, are issued from the receiver to the sender prior to data transmission. Credits are indicative of buffer space available at the receiver for holding data received from the sender. The credit issued by a receiver to a sender indicates the amount of data the sender can transmit to the receiver safely without causing buffer overflows at the receiver. As soon as data sets corresponding to the credit issued by the receiver have been transmitted, the credits are considered to be consumed and further transmission stops until additional credits are received from the receiver.

Credits have been widely used at the link layer of ATM to control congestion and flow control. Credit-based flow control is also used by the Fibre Channel standard, as specified on the Fibre Channel committee's web site at the URL: http://www.fibrechannel.org. These credits mechanisms are mainly used at all intermediate nodes between a sender and receiver to reduce the effect of congestion.

In U.S. Pat. No. 5,432,824, "Credit/Rate-Based System for Controlling Traffic in a Digital Communication Network", Zheng et al. describes a combined credit and rate-based system to control traffic in a digital communication network. Credits are used to sense congestion along all the links, each link can modify the system. The credits in combination with congestion bit flags are used to control the sending rate.

In U.S. Pat. No. 4,475,192, "Data Packet Flow Control Scheme for Switching Networks", Fernow et al. describes another credit based system that uses credits to sense conditions along all link paths.

Additionally, in U.S. Pat. No. 5,528,591, "End-To-End Credit-Based Flow Control System in a Digital Communication Network", a credit technique is used to reduce buffer requirements at intermediate ATM node buffers.

Unlike these systems, the present invention uses a credit mechanism for end-to-end flow control. Additionally, NAKs are used to indicate the necessary retransmission of lost or corrupted packets, while credits provide implicit acknowledgements. More information about ATM's use of credits can be found in, "Credit-Based Flow Control for ATM Networks", by Kung et al., appearing in IEEE Network Magazine, March/April 1995, pp. 40-48.

Instead of using the windowing mechanism and per-packet acknowledgements, which are standard for traditional TCP, the present invention uses buffer-to-buffer credits to implement flow control and negative acknowledgements to implement reliable delivery. Buffer credits sent explicitly to the sender from the receiver also function as implicit acknowledgements of bytes received successfully using credits received earlier.

The basic idea behind using buffer-to-buffer credits for implementing flow control is simple: as part of the connection setup, the initiator and responder exchange credits. Alternatively, credits may be exchanged after connection setup as a step distinct from the connection setup process but prior to the flow of any data bytes. A credit received by the initiator (or the responder) indicates the number of bytes that the initiator (or the responder) can send to the responder (or the initiator) before any acknowledgement—either explicit or implicit—arrives from the receiver. In essence, the credits are indicative of the buffer space available at the receiver. As bytes are transmitted, the credits on hand at the sending side are appropriately debited. If the credits available on hand drops to zero, the sender stops transmitting momentarily. Transmission resumes, as the credits are replenished explicitly with the arrival of a further round of credits from the receiver. These credits also serve as an implicit acknowledgement of the correct receipt of the bytes transmitted using the prior credit values.

A smooth flow is maintained by replenishing the senders credit (partially) before the credits on hand at the sending end are exhausted. If this is not done, the sender operates in a stop-and-go mode, seriously degrading the data flow rate.

When packets are corrupted or lost, the receiver requests an explicit retransmission of the packets from the sender by sending one or more negative acknowledgements (NACKs) for the lost packets. When a predetermined number of NACKs are outstanding the transmission of available credits are reduced or delayed. This prevents excessive credits being sent when the quality of the communications link degrades, congestion occurs or when load problems occur at the receiver.

The present invention extends the use of credits and NACKs to simplify buffer management (allocation and deallocation) considerably at both ends. Credit management and buffer management in the present invention is considerably simpler, faster and smarter compared to the window and buffer management overhead of the standard TCP implementation: this is one of the factors that contribute in lowering the end-to-end latency and improving overall application-level performance. In the present invention, the credits issued by the receiver are used by the sender to transmit a sequence of bytes. To maintain a smooth flow of data between the sender and the receiver, credit installments (referred hereafter as "credit units") are sent from the receiver to the sender at predetermined instances in an attempt to ensure that the sender is not waiting for credit installments to continue sending data. The initial credit issued by the receiver as well as subsequent credit units each indicate a numbered range of bytes in the byte sequence that can be transmitted using that credit unit. The arrival of a credit unit from the receiver simply extends the range of bytes in the byte sequences (as indicated by prior credits) that the sender can transmit.

The present invention achieves the bulk of its performance gains through the use of the following mechanisms: a) A credit-based flow control mechanism for fast transport. Credits are sent in installments from the receiver to the source to allow the sender to transmit packets/bytes, limited by the credit on hand at the sender. This is unlike the use of sliding window based flow control protocols, as used in TCP for instance, where the sender has to continuously monitor acknowledgements from the receiver to decide how many bytes it can transmit. When a sufficient amount of credits are available, the sender can transmit freely all bytes corresponding to the credits it has on hand without any need to check for acknowledgements. The credit based flow control mechanism used in this invention also simplifies buffer management considerably. b) The arrival of a subsequent round of credits serve as an implicit acknowledgement for a previously transmitted sequence of bytes. These bytes are removed all at once from the retransmission list (using a single unlinking operation) when such a credit installment arrives. This completely avoids explicit acknowledgements and their associated timers which would hamper performance. c) The arrival of a subsequent round of credits serve as an implicit indication of the arrival of prior credits to the sender that may have got lost or corrupted. This is because each unique credit unit specifies the permission to send an unique range of bytes in the sequence and because of subsequent credit unit extends the range of bytes that can be transmitted. This fact avoids the need for retransmission mechanisms for lost credit units, such as explicit acknowledgements. d) The use of NACKs to retransmit only the packets that were corrupted or not received. The receiving end sends a NACK for a lost or corrupted packet(s) and starts a timer (the NACK timer) to time out the arrival of the retransmitted packet(s). If this NACK timer expires before the data in the missing or corrupted packet(s) is (are) properly received, the process of sending out the NACK and timing out the response to the NACK is repeated a predetermined number of times to obtain the missing or corrupted data. If the data is not received properly after sending out the predetermined number of NACKs, the connection is considered to be in error and terminated. Thus, the only timer that is maintained by the present invention at the receiver is used sparingly—only during the rare instances when a packet fails to arrive properly. No timers are ever maintained by the sender, significantly reducing processing overhead.

Additionally, the fact that the credit-based flow control is decoupled from the NACK retransmission mechanism improves performance and transmission responsiveness. This is quite unlike TCP, which tightly couples flow control and its retransmission mechanism together. The ACKs from TCP's retransmission mechanism are not only used for retransmission but also to modify the flow control's sliding window. This coupling degrades performance by complicating the system. Additionally, this coupling makes TCP slow to respond to the load of the receiver because its flow control is modified by feedback from ACKs. The present invention is much more responsive because its flow control is directly and quickly modified by credits instead of a feedback process.

Accordingly, several objects and advantages of the invention are: (a) to provide a reliable byte stream transport system with very low end-to-end latency (b) to provide a reliable byte stream transport system with very low end-to-end latency that is significantly faster than TCP while being 100% Application Programming Interface (API) compliant with TCP. API compliance enables all client-server applications written for TCP to run without change on the present invention. (c) to provide a reliable byte stream transport system with very low end-to-end latency that is fully interoperability with TCP implementations. Hosts that use the new transport system within a LAN or larger networks can exploit its full performance potential and at the same time they can also communicate with hosts that run TCP, both within the LAN and outside the LAN. (d) to provide a reliable byte stream transport system that utilizes more of the available bandwidth in a communication environment, especially more than the effective bandwidth capabilities of TCP. (e) to provide a reliable byte stream transport system that requires less computing power to operate, especially less than TCP. This not only frees the computing power for other uses but also minimizes power consumption. This is especially important on communication nodes that have limited power resources, such as mobile devices. (f) to provide a reliable byte stream transport system that performs well when communication speeds are much faster than computing/processing speeds. (g) to provide a reliable byte stream transport system that can efficiently operate on top of other transport systems. For example, this invention can run on top of ATM without degrading performance severely. Additionally, this is done will maintaining 100% API compliance with TCP. This enables standard client-server applications written for TCP to run very efficiently over ATM without modification. This invention is not limited to TCP over ATM. Any physical network that uses TCP can benefit from this invention, including but not limited to: Ethernet, Gigabit Ethernet, ATM, Fibre Channel and all varieties of wireless networks.

It is noted, that while the present invention is particularly directed to improve the performance of the TCP protocol, there is nothing contained herein which would limit its use thereto. Any type of reliable byte stream transport protocol is amenable to processing in accordance with the system of the present invention. For example, this invention can replace the flow control and retransmission mechanism of any reliable byte stream transport protocol while maintaining the protocol's API compliance.

DETAILED DESCRIPTION OF THE INVENTION

The invention described herein is a system that provides a reliable byte stream transport system that is significantly faster than TCP while being 100% API compliant with TCP. In addition, this invention provides full interoperability with traditional TCP implementations. This interoperability feature is optional and the transport protocol described in the invention can be used on its own. Hosts running the present invention within a LAN or larger networks that have the delivery characteristics of the modern LANs can exploit its full performance potential and at the same time they can also communicate with hosts that run traditional TCP, both within the LAN and outside the LAN. Note, that even though the present invention is integrated into the traditional TCP/IP stack some one skilled in the art could easily integrate the present invention for implementing reliable transport using credits and NACKs into any reliable byte stream transport protocol. Similarly a person skilled in the art can also adapt the parallel stack scheme of the present invention to maintain compliance at the application level with a plurality of alternative implementations of reliable transport protocols.

A Generic Network Incorporating the Present Invention

Figure 1:
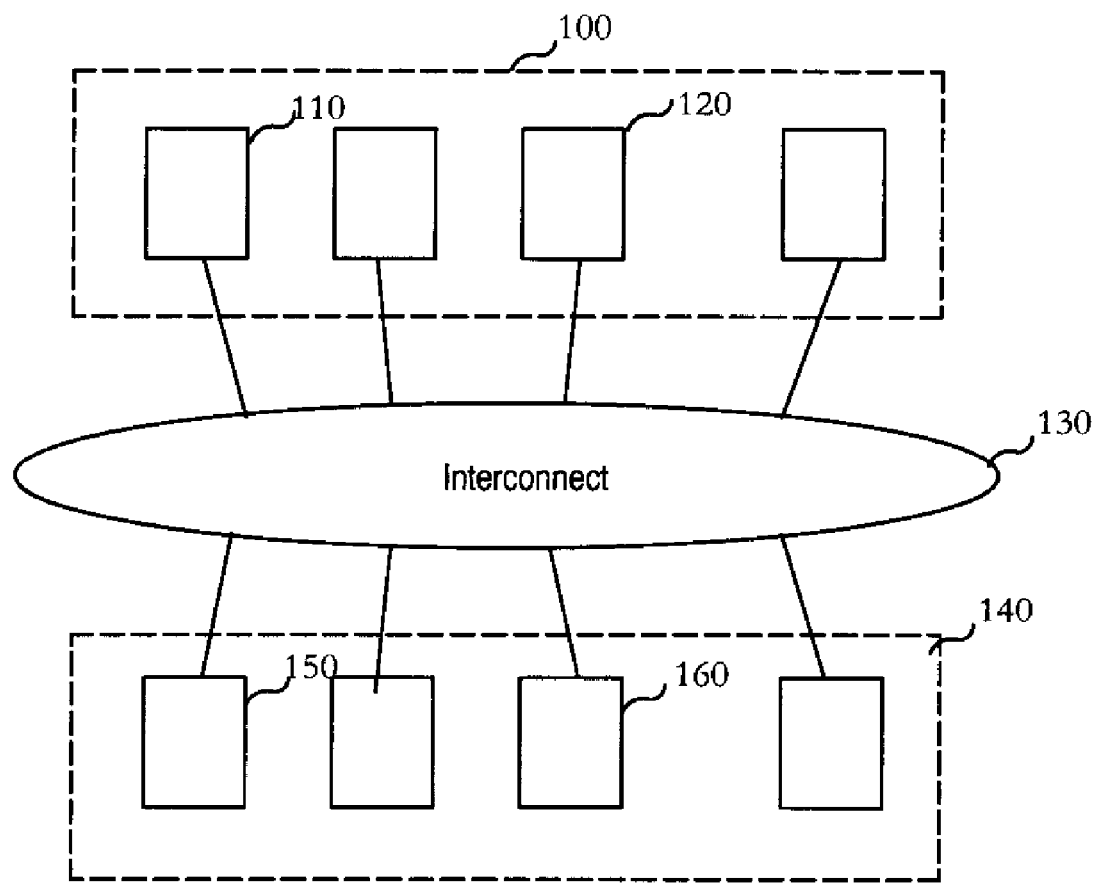
FIG. 1 is an example communication environment with multiple hosts and paths.

FIG. 1 depicts a generic network that uses TCP and the proposed invention. The hosts, as indicated by 100, are running traditional TCP as their networking transport protocol. The hosts, as indicated by 140, are running the present invention, as their networking transport protocol. A host can be any network capable device, including but not limited to: personal computers (PCs), workstations, mainframes, laptops, personal digital assistants, cell phones or networked attached storage. Within this generic network there is an interconnect 130 that connect any two hosts together. For example the following hosts can be connected with interconnect 130:
all hosts within 100, such as 110 and 120
all hosts within 140, such as 150 and 160
all hosts between 100 and 140, such as 110 and 150, 110 and 160, 120 and 150, 120 and 160

The interconnect 130, can consist of any networking interconnect, including but not limited to: Ethernet (shared media or switched), fibre channel, Myrinet, ATM or wireless. In addition, interconnect 130 can consist of any combination of networking interconnect technologies. Any given host within 100 or 140, may have multiple concurrent connections to other hosts within 100 or 140. This includes multiple independent connections to the same host, multiple connections to independent hosts or any combination of the two.

When the hosts within 100, such as 110 and 120, communicate with each other over interconnect 130 they use the standard TCP transport protocol. When the hosts within 140, such as 150 and 160, communicate with each over interconnect 130 they use the present invention. When the hosts within 100 communicate over interconnect 130 with the hosts within 140, the host within 100 uses TCP and the host within 140 uses the present invention. As will be shown in FIGS. 2 and 3, even though the hosts within 140 use the present invention they are still able to communicate with the hosts within 100 that use TCP.

Connection Setup

Before hosts can send data between themselves they first must setup a connection. Connections in the present invention are duplex. The protocol described in this invention can also be adapted by a person skilled in the arts to half-duplex connections. In TCP this is done with a 3-way handshake between the two connecting hosts. The preferred embodiment of the present invention also uses the same 3-way handshake as TCP to setup connections. At connection time, the hosts indicate what reliable transport protocol they are running, such as, but not limited to, TCP or the present invention. This information is embedded in the headers during the connection setup exchange. Alternatively, the hosts may be statically preconfigured to indicate what protocols they are running. This information is then recorded for future reference. If both hosts are executing TCP, then they use TCP. If one host only has TCP and the other host has the present invention installed then the hosts use these respective methods. If both hosts have the present invention, then the present invention is used and an initial credit exchange is sent as part of the 3-way handshake. Credits are representative of the number of bytes available in the receiving buffers of a host. The initial credit amount sent is equal to a fraction of the receiving buffer size. Someone skilled in the art could easily use a different connection mechanism and credit exchange but this is the preferred approach because it is fully compliant with existing TCP implementations and imposes minimal changes on TCP.

Various packet types used in the credit and NACK-based protocol described in the present invention (such as, but not limited to: a packet containing data, a packet containing only credits, NACKs, packets containing embedded credits) are identified to the receiving side by using appropriate information within the packet header component specific to the aforesaid protocol or in other predetermined fields of the packet. Alternatively, unused fields within the header of standard protocols, such as TCP, can be used to contain part or all of packet identification information. Where part of the packet identification information is kept within unused fields in the header of the standard protocol, the remaining identification information can be kept within the header component specific to the credit and NACK-based protocol of the invention or in other predetermined fields of the packet.

Packet Flow Paths for Sending a Packet

Figure 2:
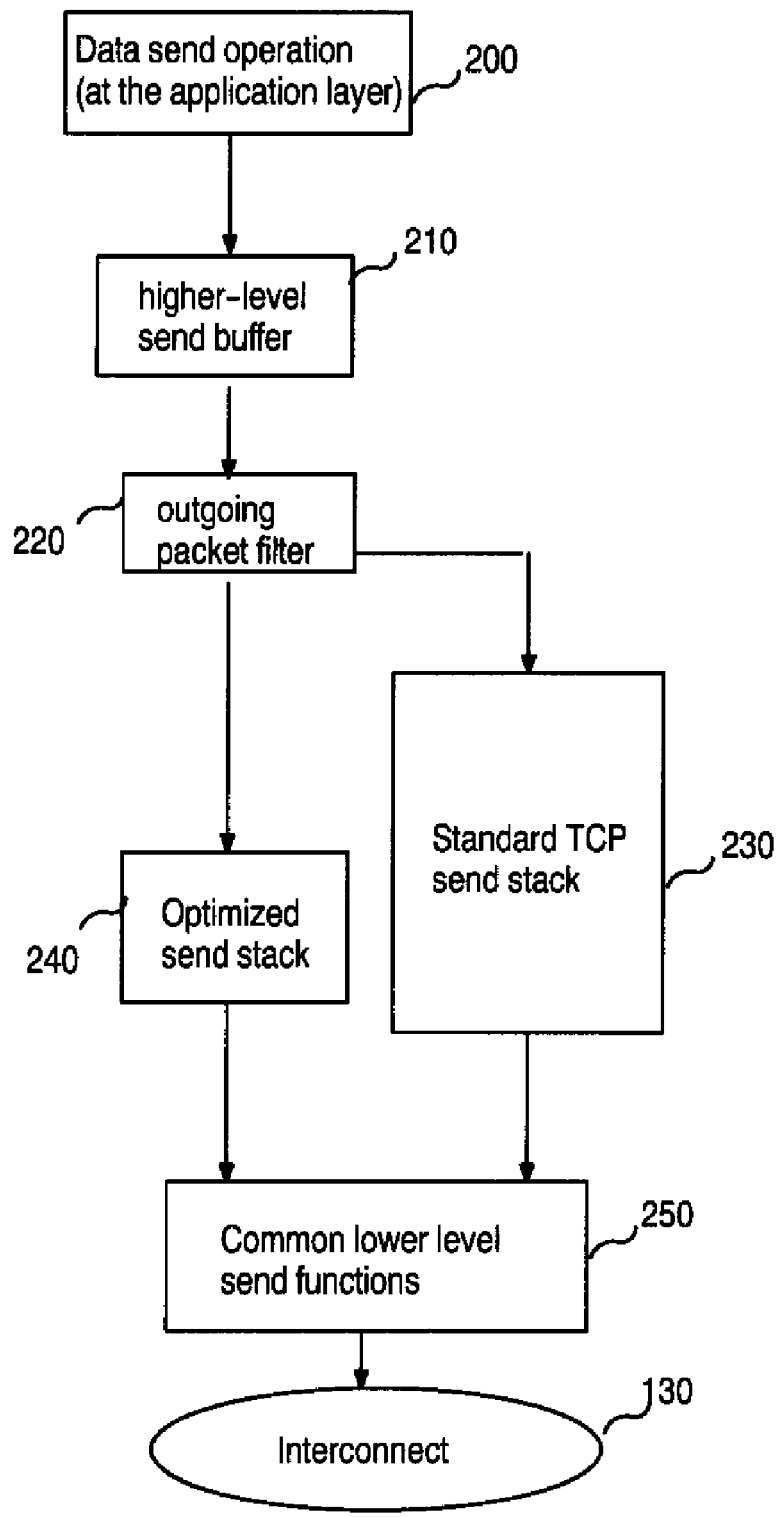
FIG. 2 depicts the data sending paths in the present invention.
Figure 3:
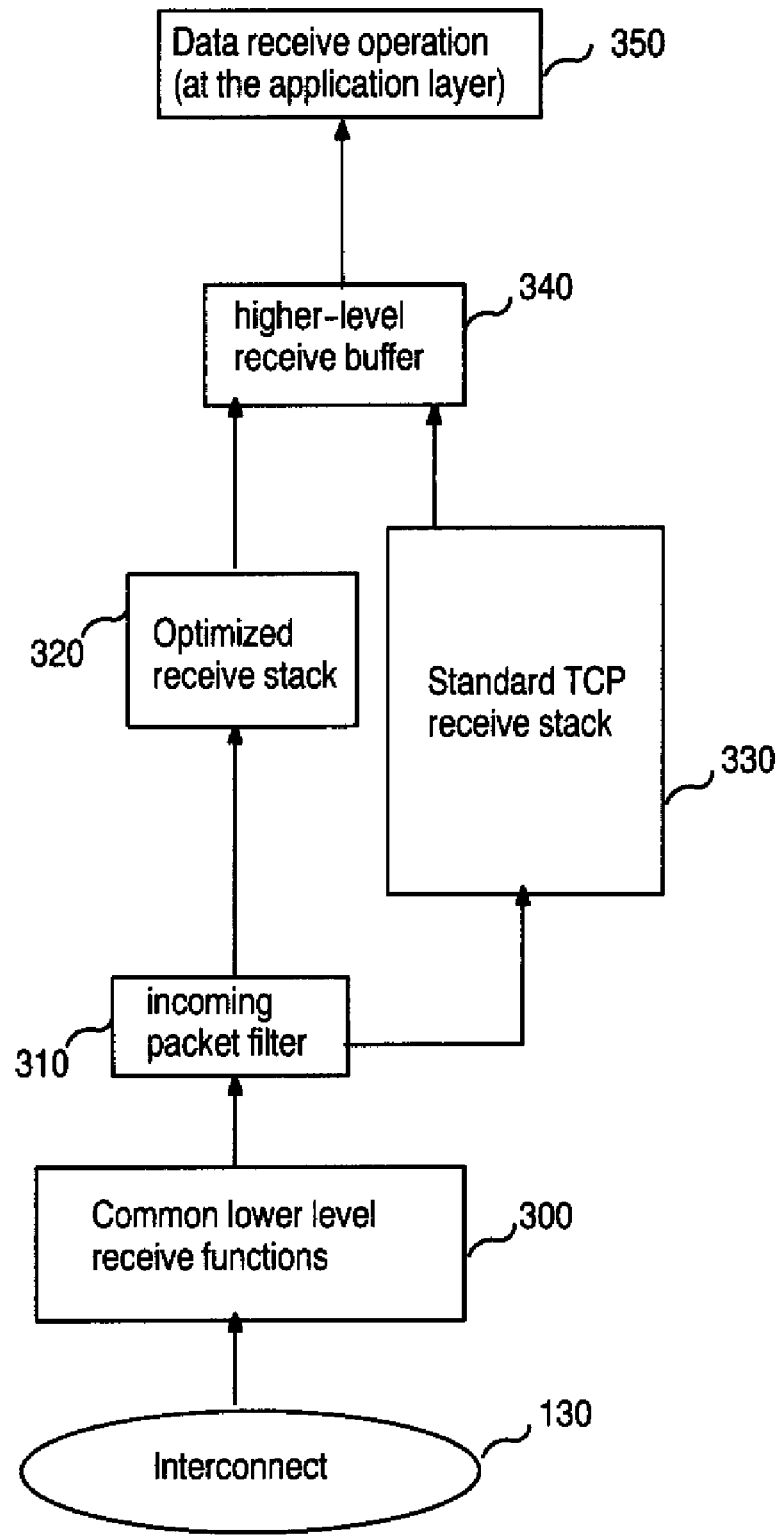
FIG. 3 depicts the packet receiving paths in the present invention.

FIG. 2 and FIG. 3 show how the present invention interfaces with existing networking software and maintains 100% API (application programming interface) compliance. The well-known Transport Control Protocol, TCP, is used as an example in FIGS. 2 and 3 and their description. Any reliable data stream transport protocol can be used instead of TCP within and as part of the present invention. Specifically, FIG. 2 shows how the present invention interacts with send operations and FIG. 3 shows how the present invention interacts with receive operations. These figures also illustrate how the present invention maintains API compliance with existing reliable byte stream transport protocols, such as, but not limited to TCP, through the use of a parallel stack. To accommodate the duplex connection, the sending side performs additional functions that transfer credits to the receiving side whenever possible to allow the receiver to send data in the opposite direction, i.e., from the receiver to the sender.

The phrase "sending data bytes", "sending bytes", "transmitting bytes" or "transmitting data bytes" and their obvious variations as used in this document implies not only the transmission of the data bytes in question but also the transmission of additional information, such as headers or trailers or both, along with such data.

FIG. 2 shows how the present invention interacts with send networking operations. The flow chart begins with a data send operation 200 that has been initiated by one or more computer processes or computer threads. The send operation can be directly initiated by the application or initiated automatically by the system when a predetermined amount of data has accumulated in the higher level buffer. Data from multiple processes can move through the flowchart of FIG. 2 at the same time. Note that the processes/threads that call the data send operation 200 do not know or need to know if the present invention is being executed. This preserves the API with existing network applications; allowing existing network applications to run without changes. As a result of data send operation 200, data is deposited in a higher-level send buffer 210. This higher-level send buffer usually resides in kernel memory but it also could possibly exist in user memory or network interface card (NIC) memory. Data send operation 200 and higher-level send buffer 210 currently exist in all TCP/IP networked devices; they are not new or part of the present invention. They are just depicted to indicate how the present invention interacts with current networking software.

Data from the higher-level send buffer 210 is then read by an outgoing packet filter 220. The outgoing packet filter 220 inspects the incoming data to determine which protocol stack should process the packet. If the outgoing data is destined for a host running TCP then outgoing packet filter 220 passes the packet to a standard TCP send stack 230. If the outgoing data is destined for a host running the present invention then the outgoing packet filter 220 passes the packet to the present invention's optimized send stack 240. Since each outgoing data is associated with a remote host that has already gone through the connection setup, the protocol used by the remote host is already known. Using this information, the outgoing packet filter 220 can easily determine if the packet should be sent to the standard TCP send stack 230 or the present invention's optimized send stack 240. The sending side puts in appropriate information within the header of the packet being sent to indicate to the receiving side what protocol stack is used to send out the packet. The receiving side uses this information to implement the packet filtering function shown in FIG. 3. This information can be embedded in the header in a variety of ways, including the use of unused flag fields in the standard header, the use of optional fields in the standard header or using specialized headers for the packets going down the optimized stack, with the specialized headers being interpreted through the use of preconfigured information about the connection.

If the data packet enters the standard TCP send stack 230, then the data packet is processed just as if the present invention were not in place and standard TCP were running. If the data packet enters the optimized send stack 240, then the data packet is processed by an optimized byte stream transport system that uses credits and NACKs without using a window-based flow control mechanism. This optimized send stack 240 will later be described in detail. The optimized send stack 240, the standard TCP send stack 230 and the outgoing packet filter 220 form what is commonly called a parallel stack; independent packets move in parallel down one of the two stacks. The parallel stack allows the present invention to communicate with hosts that have the present invention executing while also allowing communication with hosts that are just running TCP.

When the optimized send stack 240 and the standard TCP send stack 230 are finished processing their respective packets, they are sent to a common lower level send functions 250. The common lower level send functions 250 includes internet protocol (IP) and link level send functionality. The common lower level send function 250 is not new or part of the present invention. It currently exists in all TCP/IP networked devices. The common lower level send function 250 then sends the packet data onto interconnect 130 and from there is will reach the remote host.

The present invention can be further enhanced by modifying the way checksums are computed during the sending of packets. In current TCP/IP implementations checksum calculations are performed several times in the TCP and IP layers, often in a distributed fashion causing repeated data movements. For the present invention, TCP and IP checksums are both computed in one place, within the common lower level send functions 250. This conserves the amount of data movement in the course of checksum calculations. If the hardware frame checksum can be relied upon to detect data integrity, as in the case of LANs with minimal hops, checksumming can totally be eliminated. Thus the present invention abandons checksum computations for packets moving through the optimized send stack 240 when hardware frame checksum can be relied upon. Information is included in the headers of the packets exchanged during the connection setup to indicate when traditional TCP and IP checksums are abandoned in favor of the above described methods for performing checksums. For traffic coming down the standard TCP send stack 230, TCP and IP checksums are implemented as in standard TCP/IP.

Packet Flow Paths for Receiving a Packet

FIG. 3 shows how the present invention interacts with receive networking operations. This figure is very similar to FIG. 2. Packet data is transmitted from a remote host over interconnect 130 and passed to a common low level receive functions 300. The common low level receive functions 300 is not new or part of the present invention. It currently exists in all TCP/IP networked devices. The common low level receive functions 300 includes internet protocol (IP) and link level receive functionality. The common low level receive functions 300 then pass the received packets onto incoming packet filter 310.

The incoming packet filter 310 is very similar to outgoing packet filter 220. The incoming packet filter 310 inspects incoming packets and determines which protocol receive stack should process the packets. If the packet is associated with a host that is using standard TCP for network communication then incoming packet filter 310 passes the packet to a standard receive TCP stack 330. If the packet is associated with a host running the present invention then the incoming packet filter 310 passes the packet to the present invention's optimized receive stack 320. As in the outgoing packet filter 220, the incoming packet filter 310 determines what the remote host is using by looking at information that was embedded in the packet header on the sending side, as described earlier.

The standard receive TCP stack 330 is not new or part of the present invention. It currently exists in all TCP/IP networked devices. If the packet enters the standard TCP receive stack 330, then the packet is processed just as if the present invention were not in place and standard TCP was running instead. This allows a host that uses the present invention to communicate with hosts that are using just TCP. If the packet enters the present invention's optimized receive stack 320, then the packet is processed by the present invention's optimized byte stream transport system that uses credits and NACKs without using a window flow control mechanism. This optimized receive stack 320 will later be described in detail. The optimized receive stack 320 and the standard receive stack 330 form a parallel stack. The parallel stack allows the present invention to communicate with hosts that have the present invention executing while also allowing communication with hosts that are just running TCP.

When the optimized receive stack 320 and the standard TCP receive stack 330 are finished processing their respective packets, the resulting data is sent to a common higher level receive buffer 340. The common higher level receive buffer 340 usually resides in kernel memory but it also could possibly exist in user memory or network interface card (NIC) memory. A data receive operation 350 then receives data from the common higher level receive buffer 340. The data receive operation 350 is called from some process or thread. Separate packets may be associated with different processes or threads. As with the data send 200, all processes access the data receive operation 350 with the same API. The same API is used regardless of which stack, the optimized receive stack 320 or the standard TCP receive stack 330, processes the incoming packet. This enables the present invention to maintain 100% API compliance. Data receive operation 350 and higher-level receive buffer 340 currently exist in all TCP/IP networked devices; they are not new or part of the present invention. They are just shown to clearly indicate how the present invention integrates with current networking software.

The present invention can be further enhanced by modifying the way checksums are computed during the receiving of packets. In current TCP/IP implementations checksum calculations are performed several times in the TCP and IP layers, often in a distributed fashion causing repeated data movements. For the present invention, TCP and IP checksums are both computed in one place, within the common low level receive functions 300. This conserves the amount of data movement in the course of checksum calculations. If the hardware frame checksum can be relied upon to detect data integrity, as in the case of LANs with minimal hops, checksumming can totally be eliminated. Thus the present invention abandons checksum computations for packets moving through the optimized receive stack 320 when hardware frame checksum can be relied upon. Information is included in the headers of the packets exchanged during the connection setup to indicate when traditional TCP and IP checksums are abandoned in favor of the above described methods for performing checksums. If the checksum verification fails for any packet destined for the optimized receive stack 320 they are dropped prior to entry into that stack and the NACK generation process described later is directly invoked to speed up retransmission. For traffic coming up the standard receive TCP stack 330, TCP and IP checksums are implemented as in standard TCP/IP.

Even though FIG. 2 and FIG. 3 depict the present invention within a parallel stack containing TCP, other protocol stacks could be used in place of TCP. This would enable the present invention to be 100% compatible with other communication protocols. Additionally, if it can be assumed the communicating nodes both contain the present invention, then the present invention does not have to function within the parallel stack to be API compliant with TCP. In this case, a single stack with only the present invention can be used. However, this condition can not always be guaranteed and thus the use of the parallel stack is preferred. This ensures that a communicating node containing the present convention can communicate with communicating nodes without the present invention.

The Reliable Transport Method: Optimized Sending and Receiving Functions

Figure 4:
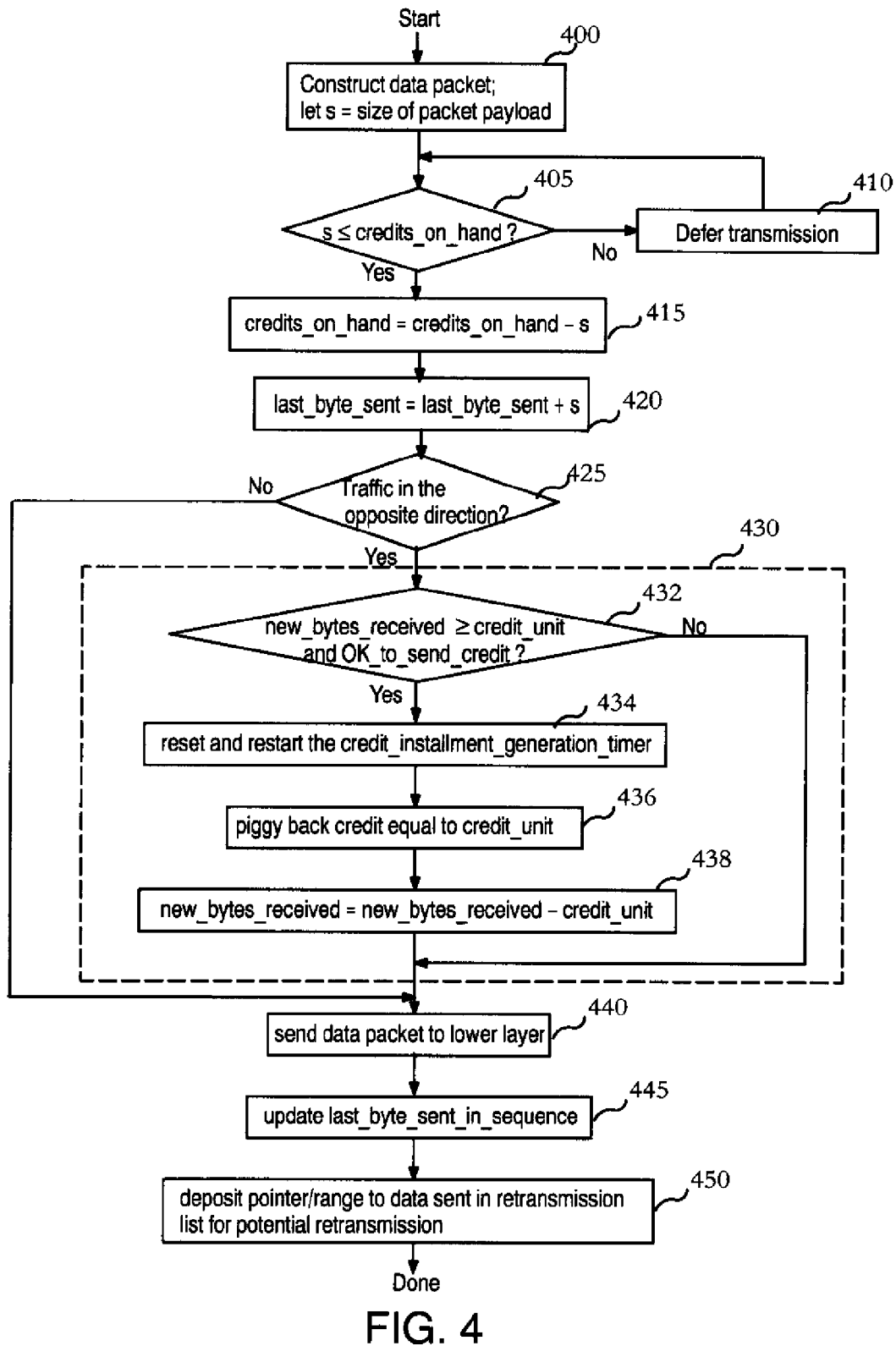
FIG. 4 depicts the steps implemented within the optimized send stack.

The present invention is a method for implementing a fast, reliable byte stream delivery that can be used within communicating protocols, as in TCP or other reliable byte stream transport protocols. In the communication system implemented by the present invention, there is the notion of a sending host and a receiving host. The sending host uses an already open connection to send a stream of consecutively numbered bytes to the receiving host. The data to be sent originates from an application and gets deposited into higher-level send buffer 210 (such as a socket buffer, in TCP) as a result of one or more calls to an application-level routine for sending the data. The data then gets moved from the high-level send buffer 210 within the sending host to the receiving host by a sending method. The sending method breaks down the data sequence in the higher level buffer into a series of packets. This part of the sending process is not new but provided by the existing functions within TCP. The formation of a packet also includes the addition of adding appropriate TCP header information and checksums for validating the integrity of a packet, using well-known methods, as in TCP. In the present invention, two sending stacks are used—the standard TCP send stack 230 and the optimized send stack 240, as shown in FIG. 2 and as described earlier. FIG. 4 depicts the main steps in the optimized sending method (shown as the optimized send stack 240, in FIG. 2) of the current invention. Header and checksum generation steps are excluded in this description because standard methods are used.

Figure 5:
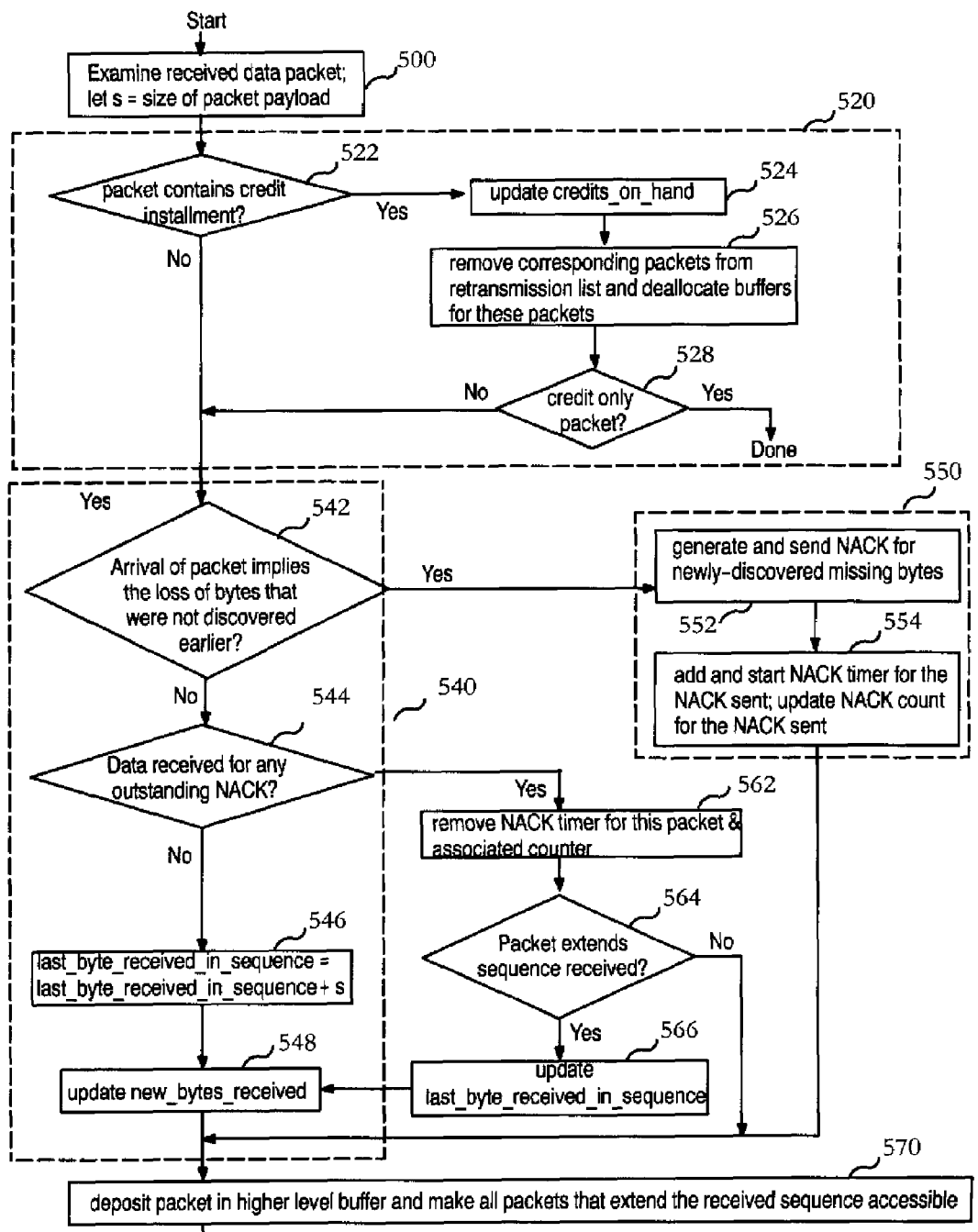
FIG. 5 depicts the steps implemented within the optimized receive stack.

When the data arrives at the receiving host, the low level receive functions 300 and incoming packet filter 310 deliver the packets to a method that implements reliable, in-order delivery, called the receiving stack. The steps for validating the integrity of the packet (using methods such as checksum verification) is not shown in FIG. 5. This step is generally implemented as the first step of the receiving protocol using techniques that are well known. In the present invention, there are two receiving methods that implement reliable delivery in conjunction with methods at the sending host. One is the standard receive stack 330 and the other is the optimized receive stack 320 (FIG. 3). FIG. 5 depicts the main steps of the method of implementing the optimized receive stack 320 in the present invention. The steps of FIG. 5 deposit data received in packets in byte-order into the higher-level receive buffer 340 (such as a socket buffer in TCP). Data is retrieved from this buffer through data receive operation 350 by the application running on the receiving host. This is done through one or more calls to an application-level receiving routine.

In describing the optimized send stack 240 and the optimized receive stack 320 that implement reliable delivery in the present invention, the following terminology is used:

The term "received byte sequence" or "sequence received" or "sequence of received bytes" all indicate the bytes received consecutively, starting with the first byte sent. It excludes bytes beyond the last byte in the sequence (i.e., the highest numbered byte in this sequence) that may have arrived before earlier bytes (i.e., lower numbered bytes) that are not part of the received sequence.

The term "packet" refers to a group of consecutively numbered bytes that are grouped together and sent out as an indivisible unit by the reliable byte stream transport system at the sending side.

Hereafter, the term "sending process" or "sending method" describes the steps implemented in the optimized send stack 240 (FIG. 2) of the present invention.

Also hereafter, the term "receiving process" or "receiving method" refers to the steps that implement the optimized receive stack 320 (FIG. 3) of the present invention.

The terms "sender" and "receiver" are also used to describe the entities that invoke (directly or indirectly) the sending and receiving processes, respectively.

In the present invention, data flow between the sender and receiver is regulated using credits for sending bytes that are issued from the receiver to the sender. For a given amount of credit issued to the sender by the receiver, the sender can send out a byte sequence whose length in bytes can be at most equal to the amount specified in the credits. Credits generally correspond to or are a function of the buffer space available at the receiver for holding incoming data. In the preferred embodiment of this invention, credits are in the form of a starting and ending byte. This enables the present invention to easily cope with lost credit installments. If a credit is lost, the sending node can infer the correct number of credits from the next credit installment.

As soon as a given number of consecutive bytes, with a given set of byte numbers, are transmitted from the sender to the receiver for the first time, the amount of credit held (in bytes) by the sender (maintained in a counter variable called "credits on hand") are decremented by the amount of bytes sent. If the same byte sequence is retransmitted (at a subsequent time), credits on hand is not impacted. Further credits, also called, "credit installments", to allow the sender to send further bytes beyond what was already sent, are sent from the receiver to the sender to maintain a smooth flow of data from the sender to the receiver. By delaying the sending of credit installments or by changing the byte range covered by a credit unit, the receiver can regulate the amount of data a sender can send. This mechanism can be used to cope with congestion in the network. Credit installments are generally piggybacked with data packets in the opposite direction. When traffic does not exist in the opposite direction or is momentarily absent, credit installments can be sent out using special control packets, as follows. These control packets do not require credits for transmission. For each connection, the receiver maintains a "credit installment generation timer" (CIGT). This timer is initialized to some predetermined value initially and counts down to zero. After carrying out actions that are appropriate when the value of the CIGT falls to zero, this timer is reinitialized to a predetermined value, possibly different from the earlier one. In general, when this timer expires, and if credit installments can be given to the sender, the receiver sends the credit installment to the sender using a special control packet that does not require any credits on hand for transmission. A condition that causes credit installments not to be given to the sender can be the existence of network congestion as evidenced by, but not limited to, the generation of a predetermined number of NACKs (see below) during a predetermined time interval. (FIG. 8 describes how the expiration of the CIGT is handled.)

The present invention also uses "negative acknowledgements" (also called NAKs or NACKs) to indicate the sender to retransmit one or more consecutive groups of data bytes, as one or more packets. Such NACKs are sent by the receiver when packets get lost or dropped (when they fail to pass the data integrity test) as control packets. The former case is explicitly shown in FIG. 5 while the latter case is not explicitly shown in the following figures because it occurs within the lower level receive functions 300 depicted in FIG. 3 (i.e. with the IP layer when TCP/IP is used). In general, a single NACK from the receiver can solicit the contents of several consecutive packets from the sender. To simplify the implementation, it is useful to solicit the contents of exactly one packet using a unique NACK.

The sender maintains for each connection, a local variable, "last byte_sent", that records the number of the highest numbered byte it has sent thus far. This variable is used mainly for bookkeeping at the sending side. This is initialized appropriately at the time of establishing the connection.

For each connection, a receiver may set up and maintain one or more timers for each NACK it has sent to the sender. NACKs are sent as a special control packets. For such control packets, credits are not required by the receiver (from the sender) for sending the NACK. An obvious possibility is to piggyback NACKs with normal traffic in the reverse direction—this is not the preferred option because of possible delays in transmission.

A receiver also maintains a variable, "new_bytes_received" to record the amount of bytes it received in strict sequence of byte numbers since it sent out a credit installment to the sender. Bytes that are not part of the received sequence do not affect the value of this variable. The receiver also maintains a variable "last_byte_received_in_sequence" to record the number of the highest numbered byte it has received in sequence (without any missing bytes in-between) from the sender. This variable is used to determine the extent of bytes that were received strictly in sequence and also the absence of one or more bytes in the received sequence. The size of the credit installment (which can be static or adapted dynamically) is maintained in a counter variable "credit unit" at the receiver.

Credit installments are also indirectly used to serve as an indirect acknowledgement for prior bytes that were successfully received in order. The sender uses this indirect acknowledgement to deallocate the prior bytes to free up buffer space at the sender. The overall flow control scheme may also use explicit acknowledgements sent on a periodic basis to inform the sender on the status of the transmitted packets. This feature is particularly useful in letting the sender know that the last fragments of a byte stream have been delivered properly to the receiver. A variety of standard and obvious implementations of such acknowledgements can be used. Such explicit acknowledgements can also be used to let the sending end know what data byte ranges can be safely dropped from retransmission buffers at the sending end since they do not have to be retransmitted. Credit installments are not sent out if there are pending NACKs for any bytes that will be deallocated by the sender on the receipt of the credit installment. A routine OK_to_send_credit is implemented by the receiver to determine if NACKs are outstanding for any bytes that will be acknowledged by the current credit installment being sent. If no such NACKs are outstanding, this function returns a true value (=YES) as an answer. This function may also be implemented to return a false value when congestion is present in the network, as evidenced, for instance, but not limited to, by the generation of a predetermined number of NACKs during a predetermined time interval.

There can be several variations in determining when credits should be generated and sent (corresponding to decision Step 430 or 800 in the descriptions given later). These variations can be but are not limited to, the following conditions under which credits can be generated and sent: (a) when a predetermined number of bytes are received from the sender, irrespective of the state of the network; (b) when a predetermined number of bytes have been received from the sender and when the level of congestion in the network is determined to be below a predetermined threshold; (c) a predetermined number of bytes have been received from the sender and when the level of data error in the network is determined to be below a predetermined threshold; (d) when it is determined that there is sufficient buffer space available on the receiving side to hold incoming packets; (e) when it is determined that there is sufficient buffer space available on the receiving side to hold incoming packets and when the level of congestion in the network is determined to be below a predetermined threshold; (f) when it is determined that there is sufficient buffer space available on the receiving side to hold incoming packets and when the level of data error in the network is determined to be below a predetermined threshold. The preferred embodiment and the one that is described subsequently is the one described under (b) above.

The Sending Method

The main steps in the sending method are as shown in FIG. 4 and are now described in detail. This sending method starts out with Step 400 that takes a sequence of bytes delivered from outgoing packet filter 220 (of FIG. 2). Step 220 also adds appropriate header information, leaving off data integrity checking information, which are added within the common lower level send functions 250 (FIG. 2). In the next step, Step 405, the size of the data (say, s) in the data received in Step 400 is compared against the amount of credits on hand, stored in variable "credits_on_hand". If sufficient credits are unavailable (i.e., when s exceeds credits_on_hand), the transmission is deferred till credit installments arrive from the receiver. This deferment may be implemented either as a busy waiting loop or a operating system process suspension. The latter is the preferred option. If sufficient amount of credits are on hand for the sender, as tested in Step 405, credits_on_hand is decremented by the size of the data (s in this case) in Step 415. In Step 420, the "last_byte_sent" variable for the connection is updated by incrementing it by the size of the data. In Step 425, it is determined if traffic is moving in the opposite direction for possible piggybacking of credits. If no opposite traffic is occurring Step 440 is executed. Otherwise, the series of steps collectively shown as Step 430 are executed. If credits need to be sent for traffic in the opposite direction, Step 430 piggybacks credits on the outgoing traffic. This series of steps starts with Step 432, where a check is made to see if the value of new_bytes_received exceeds or equals the value of credit unit and if the routine OK_to_send_credits returns a true value. If this is the case, a credit unit is generated and piggybacked with the outgoing data packet (using Steps 434, 436 and 438). If the test of Step 432 fails, the sending method proceeds on to Step 440. Note that all of the variables within Step 430 are associated with the communication connection going in the opposite direction.

In Step 434, the credit_installment_generation timer is reset and restarted with an appropriate value. In Step 436, the amount of the credit installment, as maintained in the variable credit_unit, is piggybacked into the outgoing packet. The piggybacking involves not only the embedding of the value of the credit installment amount, but also the embedding of the address (sequence number) of the first byte expected to be sent using this credit installment. This can be done in a variety of ways, such as encoding of the value into the acknowledgement field specified in the standard TCP header with appropriate changes to the header flags or as an optional header or as a combination of both. The second approach is preferred. Finally, the credit installment piggybacking steps are completed in Step 438 by decrementing/consuming new_bytes_received with the value in credit_units.

The sending process continues with Step 440 with the sending of the packet to the common lower layer protocol 250 (that do not implement reliable delivery). Processing then continues to Step 450. To allow this packet to be retransmitted at a later time when a NACK is received for the data bytes within this packet, the starting address of the bytes and the size of the packet is recorded in some appropriate data structure in the next step, Step 450. The completion of Step 450 terminates the sending method.

The Receiving Method

The steps of the receiving process are shown in FIG. 5. The receiving process of the present invention starts with Step 500, when the incoming packet filter 310 (FIG. 3) hands over a packet to the optimized receive stack 320 (FIG. 3). Step 500 completes by evaluating the amount of data bytes in the packet in a variable s and processing continues to Step 522.

The steps for handling a piggybacked credit installment or credit only installment is collectively shown as Step 520 and comprises Steps 522, 524, 526 and 528. In Step 522, a check is made to determine if the packet being processed contains a credit installment. If a credit installment is discovered, the value of credits_on_hand at the receiver is updated by incrementing it with the value of the credit_installment, as shown in step 524. The arrival of the credit installment also calls for the deallocation of packets sent earlier from the receiver in the opposite direction. This is implemented in Step 526, and processing continues with Step 528. Step 528 determines if the packet was a credit only installment. If the packet was a credit only packet the receive stack processing is complete. If the packet also contains data processing continues to Step 542. If Step 522 determines that the packet does not contain any credit installments, processing continues with Step 542. Note that steps with collective Step 520 are only executed if traffic is also occurring in the opposite direction. Thus the variables with Step 520 are associated with communication going in the opposite direction.

The deallocation of packets in Step 526 uses a simple rule to use the address of the first byte expected to be sent using the credit installment (that comes as part of the piggybacked information) as an indication of prior series of bytes received in order. There are several obvious ways of doing this. The preferred approach is to deallocate bytes numbered X through (X+CU−1) when the credit installment is received for sending bytes numbered (X+K) through (X+K+CU−1), where CU is the size of the credit unit and K is an appropriately chosen constant, either fixed or variable, dependent on the dynamics of the system. The value of K is chosen to regulate the data flow in the system and thus serves as one means for coping with any congestion in the system. Increasing the value of K effectively delays the arrival of credits for subsequent transmissions.

The series of steps collectively shown as Step 540 are processed when the packet arrives in order to extend the receive sequence. This occurs when the tests of Steps 542 and 544 fail. In Step 542, a test is made to determine if the arrival of the packet being processed does implies the loss of any prior bytes that were not known thus far as being lost. (For bytes known to be lost—or delayed—local data structures are maintained to record their identity.) If new bytes are not implied as missing, the processing continues with the next step, Step 544. In this step, a test is made to determine if any of data received was for an outstanding NACK. If no data was received for an outstanding NACK, as indicated by the failure of the test of Step 544, the packet being processed simply extend the received sequence, in which case the processing continues to Step 546 and then Step 548. In Step 546, the value of last_byte_received_in_sequence is incremented by the size of the packet. If both the tests of Steps 542 and 544 have failed, Step 548 updates the value of new_bytes_received with the size of the packet received and processing terminates with the deposition of the packet in the higher level receive buffer 340 (FIG. 3) and the data in the packet is made accessible to the application on the receiving side, in Step 570.

If the arrival of the packet being processed implies the loss of other prior bytes that were not known to be lost, as ascertained by the test of Step 542, processing continues with Steps 552 and 554, which together collectively shown as Step 550 describe the generation of a NACK to the sender for these missing bytes. In this case, processing terminates after Step 554 with the deposition of the packet into the higher level buffer 340 (FIG. 3), in Step 570, with no new packets being made accessible to the application. This is because the packet being processed arrived before one or more prior expected packets. Step 552 sends out a NACK for the newly-discovered missing bytes and records this fact in some appropriate data structure. In Step 554, a NACK timer is added and started for the NACK sent. Further, for the NACK sent, a NACK counter is set to some fixed value, say N. If N NACKs have already been sent for a given range of missing bytes when the NACK timer expires, these bytes are considered permanently lost and the connection is reset, as described later in FIG. 6. For the case described in this paragraph, the processing terminates with the transfer of the packet being received into the higher level receive buffer 340 (FIG. 3), with no access given to the packet's content in the buffer from the higher level application.

If the test of Step 544 passes, the packet being received makes up part of a sequence of bytes that was already determined to be missing, and processing continues with Step 562. In Step 562, the NACK timer for the packet being processed and its associated counter are both removed and processing continues to Step 564. In Step 564, the system determines whether the arrival of the packet extends the length of the received sequence. If the received sequence is extended, then the last_byte_received_in_sequence is updated to the number of the last byte in the extension in Step 566. Processing then continues to Step 548, where new bytes received is updated with the size of the extension. Processing then continues to Step 570, where the packet being processed is moved into the higher level receive buffer 340 (FIG. 3) and access to the bytes that extend the received sequence in this buffer is enabled to the application. If the arrival of the packet being processed did not extend the received sequence, as determined in Step 564, the packet is simply moved into the higher level receive buffer 340 (FIG. 3) in Step 570, but its contents are not made accessible to the application.

Handling NACK Timeouts

Figure 6:
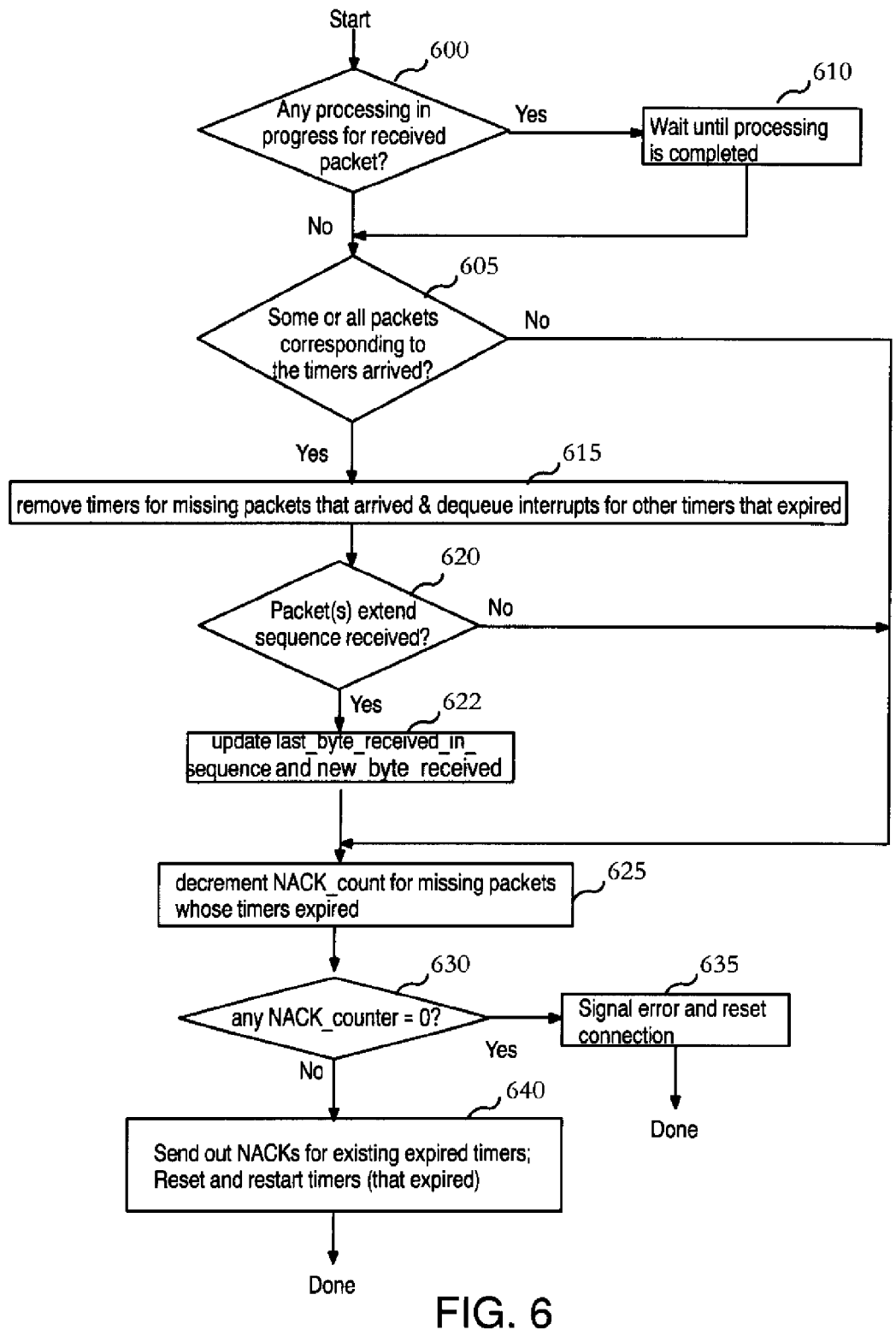
FIG. 6 depicts the steps for handling NACK timer expiration.

FIG. 6 describes the steps in the present invention for handling timeouts associated with NACKs. A NACK timer timeout is typically signaled through an interrupt. If coarse resolution timers are used, it is likely that more than one NACK timer may have expired simultaneously. The Steps of FIG. 6 handle all such expired timers.

In Step 600, a test is made to determine if any receiving process is in progress. If this is the case, further processing is deferred, in Step 610 until such receiving processes complete and processing continues with Step 605. If the test of Step 600 fails, processing continues with Step 605, in which a test is made to determine if the packets corresponding to the bytes in the missing packets arrived.

In Step 605, a test is made to determine if packets came in bearing the bytes indicated by the NACKs whose timers expired. If this test succeeds, processing continues with Step 615, otherwise; processing continues with Step 625. In Step 615, the NACK timers for the packets that arrived with missing bytes (including possibly, some timers that have not expired), are removed, along with their associated counter.

Simultaneously, any queued interrupt events for any timer removed are cancelled. Processing then proceeds to Step 620 were it is determined if the arrival of the new packet(s) extend the length of the received sequence. If the received sequence is extended, then the last_byte_received_in_sequence is updated to the number of the last byte in the extension in Step 622. Additionally, new_bytes_received is updated with the size of the extension in Step 622. Processing then continues to Step 623, where the packet being processed is moved into the higher level receive buffer 340 (FIG. 3) and access to the bytes that extend the received sequence in this buffer is enabled to the application. If the arrival of the packet being processed did not extend the received sequence, as determined in Step 620, processing moves to Step 623. In this case, the packet is simply moved into the higher level receive buffer 340 (FIG. 3) in Step 623, but its contents are not made accessible to the application. Processing then continues with Step 625.

In Step 625, the NACK counter associated with the remaining NACK timers that expired are decremented by one. If any associated counter falls below zero, as tested in Step 630, this implies that N NACKs have already been sent out for the corresponding bytes and they did not result in the reception of such bytes. In that case, an error is signaled and the connection is reset, Step 635, terminating the handling of NACK timer expiration. If the decremented NACK counters are all higher than or equal to zero, as determined in Step 630, the corresponding NACKs are resent and the existing expired NACK timers are reset and restarted in Step 640. The processing completes with Step 640.

Processing the Arrival of a NACK

Figure 7:
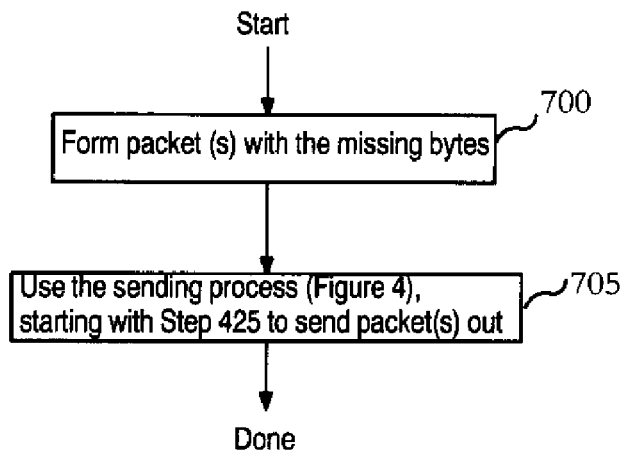
FIG. 7 depicts the steps for handling a received NACK.

The steps involved in the processing of a NACK are described in FIG. 7. This starts with Step 700, which forms one or more packets with the missing bytes and appropriate headers. Processing then continues to and terminates with Step 705. In Step 705 the packets with the missing bytes are sent using a subset of the steps shown in FIG. 4, starting at Step 425, followed by the compound Step 430 and ending with Step 430. Steps 400, 405, 410, 415 and 420 are ignored because credits are not needed to resend data that has been sent previously.

Processing the Credit Installment Generation Timer Expiration

Figure 8:
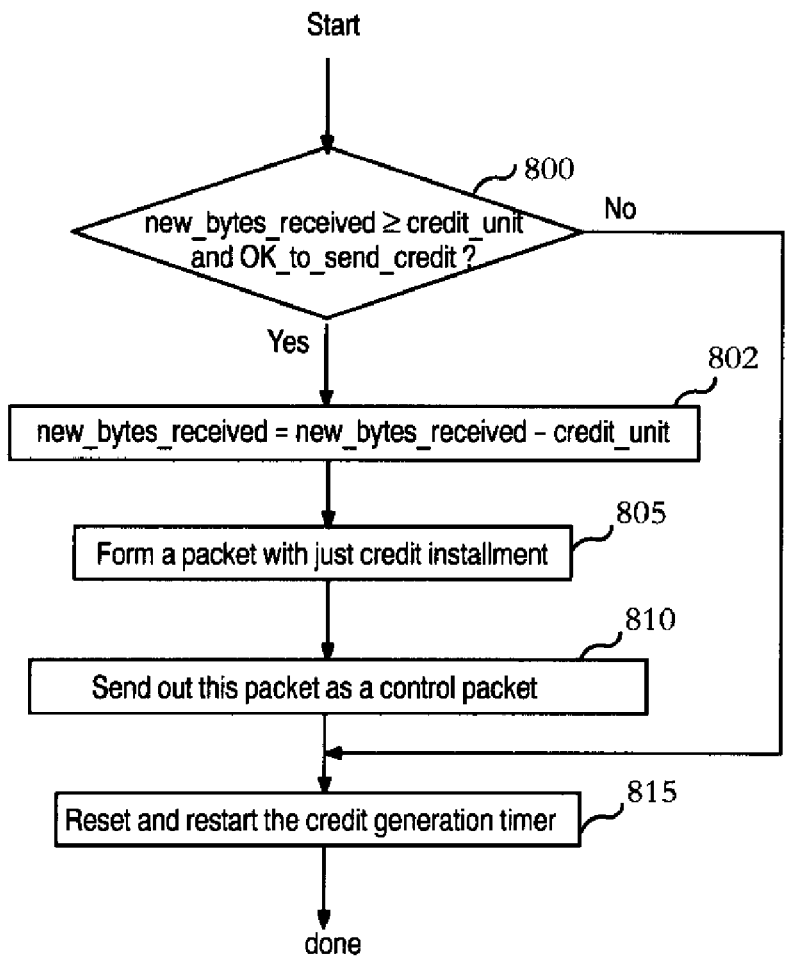
FIG. 8 depicts steps for processing Credit_Installment_Generation_Timer Expiration.

The steps for handling the expiration of a credit installment generation timer is shown in FIG. 8. This begins with Step 800, which determines if credit installments can be sent, i.e., if new_bytes_received is higher than or equal to credit_unit and the routine OK_to_send_credits returns a true value. If a credit installment can be sent, processing continues with Step 805, otherwise it continues with Step 815. In Step 805, the credit installment and associated information is used to form a packet, which is then sent out as a control packet in Step 810. Processing then continues to Step 815. The sending of control packets is not regulated by credits.

In Step 815, which terminates the processing of the handling of the CIGT expiration, the credit_installment_generation_timer is reset and restarted.

CONCLUSIONS, RAMIFICATIONS, AND SCOPE OF INVENTION

Accordingly, the reader will see that the reliable byte stream transport system of this invention enables very low end-to-end latency between nodes in a communication network. The very low latency of this invention is directly attributable to its low software overhead from the use of credits and NACKs. The latency of this invention is so low that it is nearly identical to transport systems that do not guarantee reliable, in-order delivery of byte streams. Not only does this invention reduce latency but it also utilizes the available bandwidth within a communication link more effectively, enabling more data to be transferred at any given time. In addition, the parallel stack of this invention enables the present invention to be 100% API compliant with other protocols, especially to TCP. This invention remains transparent to the TCP applications, which run without any change. At the same time it maintains full compliance with TCP connections that do not use the present invention. Thus enabling applications to communicate at a speed several times faster than what is achieved by conventional implementations of TCP, fully tapping the potentials of modern networking hardware. This invention has other unique advantages. Since the present invention has very low software overhead, CPU utilization of this invention is very low. This frees the CPU up for other important tasks. Load reduction is especially important with modern servers. Additionally, low CPU utilization means the present invention uses less power, making it ideal for mobile device with limited battery life.

Another distinct advantage of this invention is that it is well suited for communication networks of today and tomorrow. As network speeds continue to increase at a faster rate than the processing power of CPUs, low software overhead transport systems will become increasing important. Traditional transport systems, such as the sliding window mechanism in TCP, do not scale in performance with increasing network speeds.

Another advantage of this invention is that it is independent from the underlying physical network. For example, the present invention can run on top of Ethernet, Gigabit Ethernet, ATM, Fibre Channel and wireless-based networks, just to name a few. Wireless-based networks can support such devices as: PDAs, cellular phones and laptops.

While several presently preferred embodiments of the present novel invention have been described in detail herein, many modifications and variations will now become apparent to those skilled in the art. For example, there is not reason that the present invention can not be used with transport protocols other than TCP. The present invention can replace any reliable byte stream transport system of any protocol. This includes protocol specifications that have not been defined to date. It is our intent therefore, to be limited only by the scope of the appending claims and not by the specific details presented by way of illustration.

Additionally, someone skilled in the art could easily build the present invention with minor changes in its software implementation. For example, instead of using a 3-way handshake method to establish a connection between communication nodes, any type of connection method can be used. Additionally, the manner in which initial credits are exchanged between the communication nodes can vary. In some cases, it is preferred to imbed the initial credits within the connection establishment method by using free fields. In other cases, it is preferred to exchange initial credits after connection establishment by sending a credit only transmission. In addition, an initial credit amount can be assumed by the receiver during connection establishment. Furthermore, initial transmission of bytes can start earlier by allowing a predetermined number of initial bytes to be sent without any credits present. This is possible because it can be assumed a receive buffer has a minimum amount of available storage.

In the present invention, the arrival of subsequent credit installments indirectly acknowledges the reception of data sent earlier by the sender. The sender can then deallocate the acknowledged data from its buffer. This is the preferred embodiment. An alternative embodiment will be to send explicit acknowledgements from the receiver to the sender, requiring the use of additional information to identify the explicit acknowledgement to the sending side.

In the present invention, the preferred embodiment is to give credits for the transmission of each bytes with each credit measure corresponding to a single byte. Some obvious variations would be to use a different measure for the credits where each credit measure corresponds to multiples or submultiples of bytes.

In addition, the manner in which credits are consumed at a sender node in this invention is not tied to decrementing a counter. Any method that consumes credits when the sender transmits bytes is represented in this invention. Furthermore, credits do not have to represent single bytes but can represent multiple bytes and even packets. Additionally, the amount of credits consumed by the sender is variable. Credits can be delayed or reduced if momentary congestion or communication errors are detected. For example, if a predetermined number of NACKs have been sent by the receiver, all transmissions of credits can be delayed until some of the missing packets are received.

Additionally, someone skilled in the art could easily implement the NACK mechanism so that NACKs represent more than one set of consecutive missing or corrupted bytes. In the preferred embodiment, NACKs represent only one set of consecutive missing or corrupted bytes. This is done to minimize the amount of software overhead.

What is claimed is:

1. A method, comprising:
  receiving, at a transmitter, a first set of credits specifying a first starting data element and a first ending data element within a data stream;
  sending, by the transmitter, sequential data elements specified by the first set of credits, commencing at the first starting data element and ceasing at the first ending data element;
  receiving, at the transmitter, a second set of credits specifying a second starting data element and a second ending data element within the data stream, the second set of credits specifying a non-overlapping range of the sequential data elements specified by the first set of credits, wherein the second set of credits implicitly acknowledges the sequential data elements specified by the first set of credits; and
  sending, by the transmitter, sequential data elements specified by the second set of credits, commencing at the second starting data element and ceasing at the second ending data element.

2. The method of claim 1, further comprising receiving an acknowledgement representing receipt of a range of the sequential data elements specified by the second set of credits.

3. The method of claim 1, further comprising receiving a negative acknowledgement representing a failure of receipt of the sequential data elements specified by the second set of credits within a predetermined period of time.

4. The method of claim 3, further comprising sending a packet of data representing a range of the sequential data elements specified by the negative acknowledgement upon receipt of the negative acknowledgment.

5. The method of claim 3, further comprising determining an indication of network congestion based on a rate of negative acknowledgements.

6. The method of claim 1, wherein at least one of the first and second set of credits is defined based on a capacity of a buffer at a receiver.

7. The method of claim 1, wherein receiving the first set of credits comprises receiving the first set of credits in response to a number of credits on hand being zero.

8. The method of claim 1, wherein a number of data elements represented by the first set of credits is different that a number of data elements represented by the second set of credits.

9. The method of claim 1, wherein receiving the second set of credits comprises acknowledging receipt of the sequential data elements specified by the first set of credits.

10. The method of claim 1, wherein the first set of credits comprise a first number of data elements to be transmitted, and further comprising:
  reducing a number of credits remaining based on a transmission of data elements, wherein transmission ceases in response to the number of credits reaching zero.

11. The method of claim 1, wherein the second set of credits is not part of an explicit acknowledgment message.

12. A method, comprising:
  transmitting, from a receiver, a first set of credits specifying a first starting data element and a first ending data element within a data stream;
  receiving, at the receiver, sequential data elements specified by the first set of credits;
  transmitting, from the receiver, a second set of credits specifying a second starting data element and a second particular ending data element within the data stream, wherein the second set of credits implicitly acknowledges the sequential data elements specified by the first set of credits; and
  receiving, at the receiver, sequential data elements specified by the second set of credits, the second set of credits specifying a non-overlapping range of the sequential data elements specified by the first set of credits.

13. The method of claim 12, further comprising transmitting a negative acknowledgement (NACK) representing a failure to receive one or more data elements within a predetermined period of time.

14. The method of claim 12, wherein at least one of the first and second set of credits is defined based on a capacity of a buffer at a receiver.

15. The method of claim 12, wherein a number of data elements represented by the first set of credits is different that a number of data elements represented by the second set of credits.

16. The method of claim 12, wherein transmitting the second set of credits comprises acknowledging receipt of the sequential data elements specified by the first set of credits.

17. The method of claim 12, further comprising determining an indication of network congestion based on a rate of negative acknowledgements.

18. A non-transitory computer readable medium, having stored therein instructions, the instructions comprising:
  receiving, at a transmitter, a first set of credits specifying a first starting data element and a first ending data element within a data stream;
  sending, by the transmitter, sequential data elements specified by the first set of credits, commencing at the first starting data element and ceasing at the first ending data element;
  receiving, at the transmitter, a second set of credits specifying a second starting data element and a second ending data element within the data stream, the second set of credits specifying a non-overlapping range of the sequential data elements specified by the first set of credits, wherein the second set of credits implicitly acknowledges the sequential data elements specified by the first set of credits; and sending, by the transmitter, sequential data elements specified by the second set of credits, commencing at the second starting data element and ceasing at the second ending data element.

19. The non-transitory computer readable medium of claim 18, wherein sending the sequential data elements specified by the first set of credits are comprises sending the sequential data elements specified by the first set of credits via a Transmission Control Protocol (TCP) packet.

20. The non-transitory computer readable medium according to claim 18, wherein receiving the first set of credits comprises receiving the first set of credits in a byte stream.

21. The non-transitory computer readable medium of claim 18, wherein the second set of credits is not part of an explicit acknowledgment message.

22. An apparatus, comprising:
means for receiving a first set of credits specifying a first starting data element and a first ending data element within a data stream;
means for sending sequential data elements specified by the first set of credits, commencing at the first starting data element and ceasing at the first ending data element;
means for receiving a second set of credits specifying a second starting data element and a second ending data element within the data stream, the second set of credits specifying a non-overlapping range of the sequential data elements specified by the first set of credits, wherein the second set of credits implicitly acknowledges the sequential data elements specified by the first set of credits; and
means for sending sequential data elements specified by the second set of credits, commencing at the second starting data element and ceasing at the second ending data element.

23. The apparatus of claim 22, wherein the second set of credits is not part of an explicit acknowledgment message.

24. An apparatus, comprising:
means for transmitting a first set of credits specifying a first starting data element and a first ending data element within a data stream;
means for receiving sequential data elements specified by the first set of credits;
means for transmitting a second set of credits specifying a second starting data element and a second particular ending data element within the data stream, wherein the second set of credits implicitly acknowledges the sequential data elements specified by the first set of credits; and
means for receiving sequential data elements specified by the second set of credits, the second set of credits specifying a non-overlapping range of the sequential data elements specified by the first set of credits.

25. A non-transitory computer readable medium having instructions stored thereon, the instructions comprising:
transmitting, at a receiver, a first set of credits specifying a first starting data element and a first ending data element within a data stream;
receiving, at the receiver, sequential data elements specified by the first set of credits;
transmitting, at the receiver, a second set of credits specifying a second starting data element and a second particular ending data element within the data stream, wherein the second set of credits implicitly acknowledges the sequential data elements specified by the first set of credits; and
receiving, at the receiver, sequential data elements specified by the second set of credits, the second set of credits specifying a non-overlapping range of the sequential data elements specified by the first set of credits.

* * * * *

UNITED STATES PATENT AND TRADEMARK OFFICE
CERTIFICATE OF CORRECTION

PATENT NO. : 7,899,925 B2  
APPLICATION NO. : 11/950322  
DATED : March 1, 2011  
INVENTOR(S) : Ghose et al.

Page 1 of 1

It is certified that error appears in the above-identified patent and that said Letters Patent is hereby corrected as shown below:

Column 23, line 10, in Claim 19, delete "credits are" and insert -- credits --.

Signed and Sealed this
Twelfth Day of July, 2011

David J. Kappos
*Director of the United States Patent and Trademark Office*